United States Patent
Mori et al.

(10) Patent No.: US 8,168,154 B2
(45) Date of Patent: May 1, 2012

(54) START-UP METHOD FOR PRODUCING CHLORINE

(75) Inventors: Yasuhiko Mori, Ehime (JP); Tadashi Abe, Ehime (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 240 days.

(21) Appl. No.: 12/439,613

(22) PCT Filed: Sep. 4, 2007

(86) PCT No.: PCT/JP2007/067554
§ 371 (c)(1),
(2), (4) Date: Mar. 2, 2009

(87) PCT Pub. No.: WO2008/029940
PCT Pub. Date: Mar. 13, 2008

(65) Prior Publication Data
US 2010/0028248 A1    Feb. 4, 2010

(30) Foreign Application Priority Data
Sep. 6, 2006 (JP) ................. 2006-241445

(51) Int. Cl.
*C01B 7/04* (2006.01)
(52) U.S. Cl. .................. 423/500; 423/502; 423/507
(58) Field of Classification Search .............. 423/500, 423/502, 507
See application file for complete search history.

(56) References Cited

U.S. PATENT DOCUMENTS

| | | | |
|---|---|---|---|
| 4,774,070 A * | 9/1988 | Itoh et al. | 423/502 |
| 5,137,701 A * | 8/1992 | Mundt | 423/210 |
| 5,302,187 A | 4/1994 | Itoh et al. | |
| 5,411,641 A | 5/1995 | Trainham, III et al. | |
| 5,538,535 A | 7/1996 | Pinnau et al. | |
| 5,871,707 A | 2/1999 | Hibi et al. | |
| 5,908,607 A | 6/1999 | Abekawa et al. | |
| 6,152,986 A * | 11/2000 | Foller | 95/47 |
| 6,387,345 B1 * | 5/2002 | Gestermann et al. | 423/502 |
| 6,977,066 B1 | 12/2005 | Iwanaga et al. | |
| 2002/0028173 A1 | 3/2002 | Hibi et al. | |
| 2002/0172640 A1 | 11/2002 | Hibi et al. | |
| 2003/0024824 A1 | 2/2003 | Bulan et al. | |

FOREIGN PATENT DOCUMENTS
JP    3-262514 A    11/1991
(Continued)

OTHER PUBLICATIONS

"Soda Handbook 1998", Japan Soda Industry Association, pp. 296-297, pp. 315, (Fig. 3.173), Partial English Translation Thereof.

*Primary Examiner* — Ngoc-Yen Nguyen
(74) *Attorney, Agent, or Firm* — Sughrue Mion, PLLC

(57) ABSTRACT

A start-up method of a process for producing chlorine from hydrogen chloride has a mixed gas producing step of producing a mixed gas containing chlorine from hydrogen chloride, a compressed mixed gas producing step of introducing the mixed gas into an inlet of a compressor and compressing the mixed gas in compressor, a purifying step of introducing the compressed mixed gas into a purifying column and separating the compressed mixed gas into purified chlorine and impurities by distillation, and a recompressing step of introducing the purified chlorine into an inlet of the compressor and compressing the mixed gas and the purified chlorine.

2 Claims, 5 Drawing Sheets

FOREIGN PATENT DOCUMENTS

| | | |
|---|---|---|
| JP | 9-67103 A | 3/1997 |
| JP | 10-25102 A | 1/1998 |
| JP | 10-182104 A | 7/1998 |
| JP | 10-194705 A | 7/1998 |
| JP | 10-338502 A | 12/1998 |
| JP | 11-500954 A | 1/1999 |
| JP | 11-180701 A | 7/1999 |
| JP | 2000-34105 A | 2/2000 |
| JP | 2000-272907 A | 10/2000 |
| JP | 2001-139305 A | 5/2001 |
| JP | 2001-516333 A | 9/2001 |
| JP | 2002-316804 A | 10/2002 |
| JP | 2003-49290 A | 2/2003 |
| JP | 2003-135902 A | 5/2003 |
| JP | 2003-181235 A | 7/2003 |
| JP | 2003-261306 A | 9/2003 |
| JP | 2003-292304 A | 10/2003 |
| JP | 2005-306712 A | 11/2005 |
| JP | 2005-306715 A | 11/2005 |
| JP | 2006-219369 A | 8/2006 |
| WO | 96/26784 A1 | 9/1996 |
| WO | 97/24320 A1 | 7/1997 |

* cited by examiner

START-UP METHOD FOR PRODUCING CHLORINE

TECHNICAL FIELD

The present invention relates to a start-up method, and more specifically relates to a start-up method of a process for producing chlorine from hydrogen chloride.

BACKGROUND ART

Chlorine is useful as a raw material of vinylchloride, phosgene, etc., and is known to be obtained by oxidation of hydrogen chloride. Chlorine used in such use is generally desired to have a high-purity quality of 99% by volume or more. An example of the methods of producing high-purity chlorine includes a method of producing chlorine by a hydrochloric acid oxidation process described in Japanese Patent Laying-Open No. 2005-306715 (Patent Document 1). The above-described Patent Document 1 discloses that chlorine with a desired quality (purity) is obtained by purifying a mixed gas containing chlorine obtained by performing an oxidation reaction of gas containing hydrogen chloride with oxygen in a distillation column and separating oxygen and carbon dioxide that accompanies with the mixed gas. The quality of chlorine is determined by the cooling temperature, the bottom temperature, the number of steps of the distillation column, etc.

Since the inside of the system is filled with an inert gas, air, etc. during the start-up of the chlorine oxidation process in the Patent Document 1, the purity of the chlorine purified in the distillation column decreases by mixing the inert gas and air again. Therefore, it is necessary to discharge the inert gas and air in the system during the start-up. Accordingly, the chlorine purified in the distillation column is normally discharged outside of the system through a pipe connected to the outside of the system without sending it out to a pipe that feeds product chlorine.

However, since purging such gas outside of the system during the start-up is to discharge the chlorine purified in the distillation column from the inside of the system, there is a problem that efficiency of producing chlorine decreases.

Further, it is necessary to detoxify chlorine from the gas containing chlorine by neutralizing with an alkaline solution before purging it to the outside of the system. Therefore, there is a problem that the alkaline solution is consumed during the start-up.

DISCLOSURE OF THE INVENTION

The present invention was made in order to solve the problems as described above, and an object of the present invention is to provide a start-up method that reduces an amount to be used of the alkaline solution that is necessary to treat chlorine when purging it to the outside of the system by reducing chlorine that is discharged from the inside of the system.

The start-up method in the present invention is a start-up method of a process for producing chlorine from hydrogen chloride, and includes a mixed gas producing step, a compressed mixed gas producing step, a purifying step, and a recompressing step. The mixed gas producing step produces a mixed gas containing chlorine from hydrogen chloride. The compressed mixed gas producing step produces a compressed mixed gas by introducing a mixed gas into the inlet of a compressor and compressing the mixed gas in the compressor. The purifying step introduces the compressed mixed gas into a purified column and separates the compressed mixed gas into refine chlorine and impurities by distillation. The recompressing step introduces the purified chlorine in the inlet of the compressor and compresses the mixed gas and chlorine.

According to the start-up method in the present invention, the purified chlorine obtained in the purifying column is introduced into the purifying column again through the compressor. That is, since the purified chlorine stays or circulates inside the system, the chlorine discharged from inside of the system during the start-up can be reduced. Further, since the chlorine that is purged to the outside of the system can be reduced, an amount to be used of the alkaline solution that is necessary to treat the chlorine when purging it to the outside of the system can be cut down.

In the above-described start-up method, the purifying step preferably includes a step of discharging the impurities from the column top of the purifying column. Thus, the impurities that are distilled can be more effectively purged from the purifying column to the outside of the system.

The above-described start-up method preferably further has a measuring step of measuring the purity of the purified chlorine that is discharged from the purifying column.

Thus, since the purity of the purified chlorine can be managed, the purity of the purified chlorine can be made into a desired range, and high quality can be maintained.

In the above-described start-up method, the recompressing step is preferably performed when the purity of the purified chlorine is less than a prescribed purity in the measuring step.

Thus, the purified chlorine stays or circulates inside the system until the purity of the purified chlorine is satisfactorily in a prescribed range. Therefore, the chlorine that is discharged from inside of the system can be reduced more during the start-up. Further, since the amount of the chlorine that is discharged from inside of the system can be reduced, the amount of the alkaline solution that is necessary to detoxify the chlorine can be reduced. Furthermore, since the purity of the purified chlorine can be strictly controlled, the purity of the product chlorine can be maintained.

In the above-described start-up method, the mixed gas producing step preferably has a step of obtaining a mixed gas containing chlorine and oxygen by oxidizing hydrogen chloride. Thus, chlorine can be produced effectively.

According to the start-up method in the present invention, the amount to be used of the alkaline solution that is necessary to treat chlorine when purging it to the outside of the system can be reduced by reducing the chlorine discharged from the inside of the system.

EXPLANATION OF THE REFERENCE NUMERALS

Figure 1:
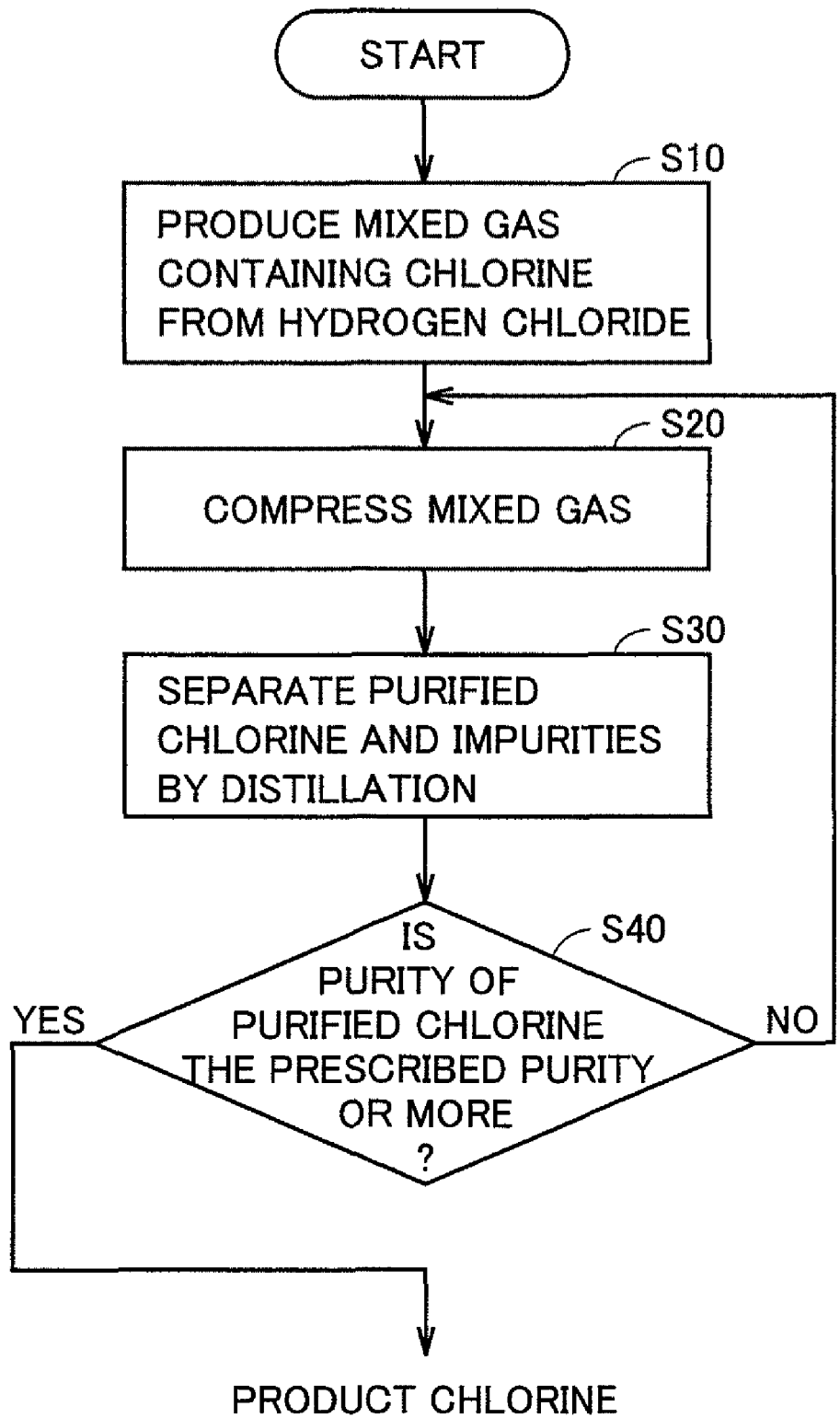
FIG. 1 is a flow chart showing the start-up method in Embodiment 1 of the present invention.

101 reactor, 102, 201 absorbing column, 103 drying column, 104 compressor, 104a inlet, 105 refining column, 105a column top, 106, 107 valve, 108 liquid salt drum, 109 carburetor, 202 liquid phase electric vessel, 301 electrochemical vessel, 401 electrolytic vessel, 401a cathode chamber, 401b anode chamber, 401c anode, 401d oxygen consumption type cathode, 401e cation exchange film, 401f current distributor.

BEST MODES FOR CARRYING OUT THE INVENTION

Below, the embodiments of the present invention are described based on the drawings. Moreover, the same reference numeral is attached to the same or the corresponding part in the drawings below, and its description is not repeated.

(Embodiment 1)

Figure 2:
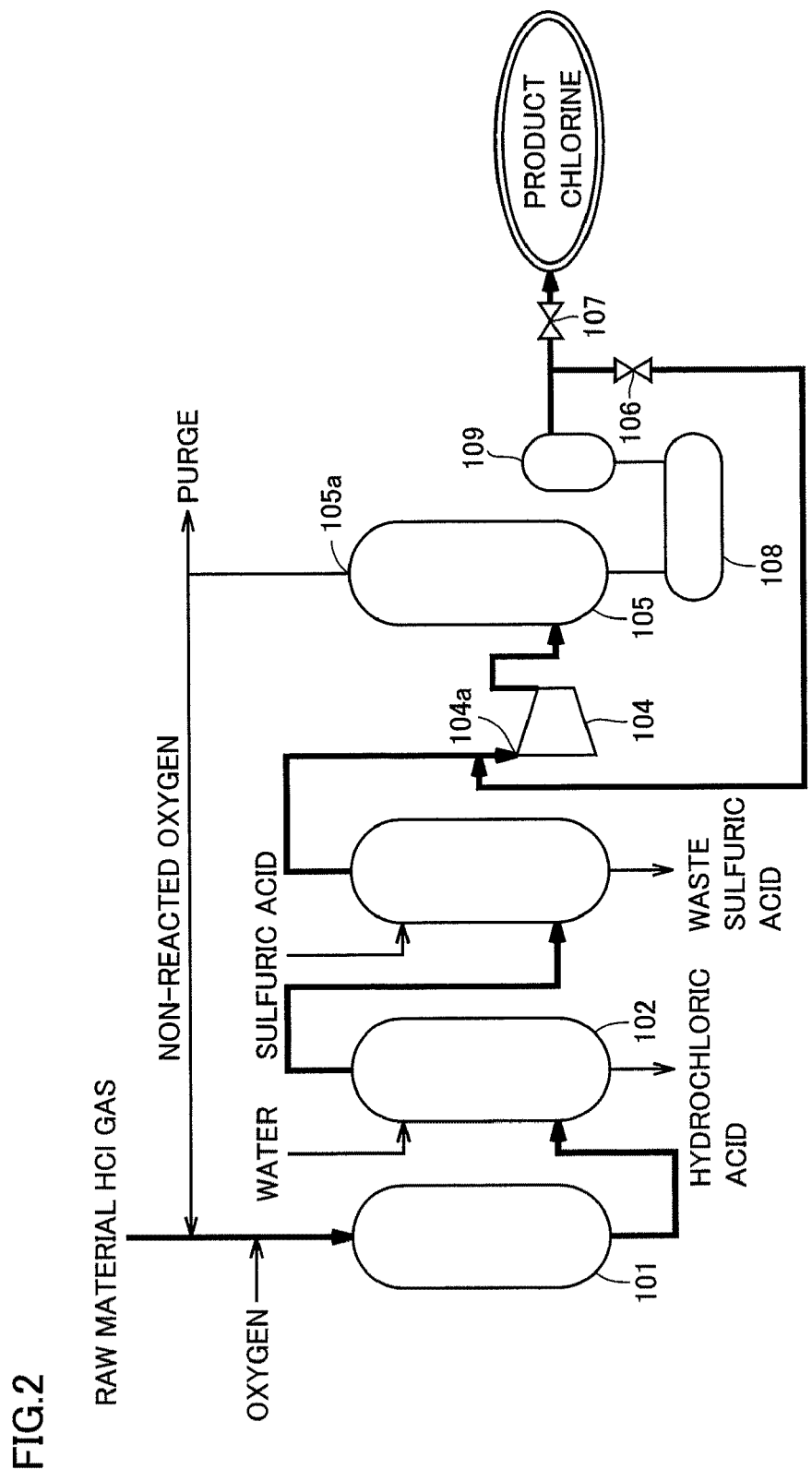
FIG. 2 is a view to describe the start-up method in Embodiment 1 of the present invention.

Referring to FIGS. 1 and 2, the start-up method in Embodiment 1 of the present invention is described. Embodiment 1 is a start-up method of a hydrochloric acid oxidation method (a catalytic vapor-phase oxidation method) as a process of producing chlorine from hydrogen chloride. Moreover, FIG. 1 is a flow chart showing the start-up method in Embodiment 1 of the present invention. FIG. 2 is a view to describe the start-up method in Embodiment 1 of the present invention.

<Mixed Gas Producing Step>

First, as shown in FIG. 1, the mixed gas producing step (S10) of producing a mixed gas containing chlorine from hydrogen chloride is performed. The mixed gas producing step (S10) in Embodiment 1 includes a pretreatment step (S11), a reaction step (S12), an absorption step (S13), and a drying step (S14). Gas containing hydrogen chloride is used as a raw material of chlorine. Moreover, the mixed gas producing step (S10) in Embodiment 1 includes a step of obtaining a mixed gas containing chlorine and oxygen by oxidizing hydrogen chloride. The step of obtaining a mixed gas containing chloride and oxygen has at least the reaction step (S12), the absorption step (S13), and the drying step (S14).

In the mixed gas producing step (S10), specifically, first, the pretreatment step (S11) is preferably performed in a pretreatment column (not shown) for removing impurities of the gas containing hydrogen chloride that becomes a raw material of chlorine. In the pretreatment step (S11), the gas containing hydrogen chloride is introduced to the pretreatment column for example, and impurities such as aromatic compounds, chlorinated aliphatic hydrocarbons, chlorinated aromatic hydrocarbons, and inorganic compounds having a high boiling point are removed in advance. A generally known method can be adopted as the pretreatment method, and an example includes an absorption treatment by activated carbon, zeolite, etc. Further, an inert gas component and a high boiling point component may be removed by absorbing the gas containing hydrogen chloride to water or dilute hydrochloric acid and diffusing the hydrogen chloride gas from the obtained absorption liquid (for example, Japanese Patent Application Laying-Open No. 2000-34105). Moreover, the pretreatment step (S11) may be omitted.

Any gas containing hydrogen chloride that is generated in a thermal decomposition reaction and a combustion reaction of a chlorine compound, in a phosgenation reaction or a chlorination reaction of an organic compound, by combustion in an incinerator, etc. can be used as the gas containing hydrogen chloride. The concentration of hydrogen chloride in the gas containing hydrogen chloride that can be used is 10% by volume or more, preferably 50% by volume or more, and more preferably 80% by volume or more. In the case that the concentration of hydrogen chloride is lower than 10% by volume, the concentration of oxygen in the gas (impurity) having non-reacted oxygen as a main component that is obtained in a purifying step (S30) described later becomes low, and the amount of the gas that is supplied to the reaction step (S12) in a circulation step described later may be reduced.

The components other than hydrogen chloride in the gas containing hydrogen chloride are chlorinated aromatic hydrocarbons such as octodichlorobenzene and monochlorobenzene, aromatic hydrocarbons such as toluene and benzene, chlorinated hydrocarbon such as vinyl chloride, 1,2-dichloroethane, methyl chloride, chlorine tetrachloride, and ethyl chloride, hydrocarbons such as methane, acetylene, ethylene, and propylene, and inorganic gases such as nitrogen, argon, carbon dioxide, carbon monoxide, phosgene, hydrogen, carbonylsulfide, hydrogen sulfide, and sulfur dioxide. In the reaction of hydrogen chloride and oxygen, chlorinated aromatic hydrocarbons and chlorinated hydrocarbons are oxidized into carbon dioxide and water, carbon dioxide is oxidized into carbon dioxide, and phosgene is oxidized into carbon dioxide and chlorine.

Next, as shown in FIG. 2, the reaction step (S12) of obtaining gas having chlorine, water, non-reacted hydrogen chloride, and non-reacted oxygen as main components is performed by oxidizing the gas containing hydrogen chloride with gas containing oxygen in a reactor 101 under a catalyst.

In the reaction step (S12), the gas containing oxygen is introduced to reactor 101 with the gas containing hydrogen chloride in which the impurities were removed in the pretreatment step (S11). In reactor 101, hydrogen chloride is oxidized by oxygen by the following formula, and chlorine is produced.

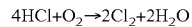

$$4HCl + O_2 \rightarrow 2Cl_2 + 2H_2O$$

Oxygen or air can be used as the gas containing oxygen. The concentration of oxygen that can be used is preferably 80% by volume or more, and more preferably 90% by volume or more. In the case that the concentration of oxygen is smaller than 80% by volume, the oxygen concentration in the gas having non-reacted oxygen obtained in the purifying step (S30) described later becomes low, and the amount of the gas supplied into the reaction step (S12) may be reduced in the circulation step described later. The gas containing oxygen having an oxygen concentration of 80% by volume or more can be obtained with a normal industrial method such as a pressure swing method and cryogenic separation of air. The components other than hydrogen chloride in the gas containing oxygen include nitrogen ($N_2$) and argon (Ar).

The theoretical molar amount of oxygen to hydrogen chloride 1 mol is 0.25 mol. However, it is preferable to supply oxygen at the theoretical amount or more, and it is further preferable to supply oxygen so that the amount of oxygen becomes 0.25 to 2 mol to hydrogen chloride 1 mol. When the amount of oxygen is too small, there is a case that the conversion rate of hydrogen chloride becomes low. On the other hand, when the amount of oxygen is too large, there is a case that it becomes difficult to separate the produced chlorine and the non-reacted oxygen.

In the reaction step (S12), gas having chlorine, water, non-reacted hydrogen chloride, and non-reacted oxygen as the main components is preferably obtained by oxidizing hydrogen chloride with oxygen under the existence of a catalyst containing ruthenium and/or a ruthenium compound, etc. By using ruthenium and/or a ruthenium compound as a catalyst, trouble with blocking of the pipe, etc. due to volatilization and scattering of the catalyst component is prevented, and a treatment step of the volatilized or scattered catalyst component becomes unnecessary. Furthermore, since chlorine can be produced at a more advantageous temperature also from the viewpoint of chemical equilibrium, a post process such as the absorption step (S13), the drying step (S14), and the purifying step (S30) described later can be simplified, and equipment cost and operating cost can be kept low.

The above-described catalyst containing ruthenium and/or a ruthenium compound that can be used is a known catalyst (described in Japanese Patent Laying-Open No. 9-67103, Japanese Patent Laying-Open No. 10-182104, Japanese Patent Laying-Open No. 10-194705, Japanese Patent Laying-Open No. 10-338502, and Japanese Patent Laying-Open No. 11-180701).

In the reaction step (S12), chlorine gas is preferably produced by reacting hydrogen chloride gas and oxygen gas using a catalyst containing ruthenium oxide. In the case of using a catalyst containing ruthenium oxide, there is an advantage that the conversion rate of hydrogen chloride remarkably improves. The content of ruthenium oxide in the catalyst is preferably in a range of 0.1 to 20% by mass. In the case that the amount of ruthenium oxide is less than 0.1% by mass, there is a case that the catalytic activity is low and the conversion rate of hydrogen chloride becomes low, and on the other hand, in the case that the amount of ruthenium is more than 20% by mass, there is a case that the price of the catalyst becomes high. Moreover, the conversion rate of hydrogen chloride is preferably 85% or more.

Especially, a ruthenium oxide carrying catalyst having a content of ruthenium oxide of 0.1 to 10% by mass and a central diameter of ruthenium oxide of 1.0 to 10.0 nanometer as described in Japanese Patent Application Laying-Open No. 10-338502 for example or a ruthenium oxide complex oxide compound type catalyst can be also preferably used.

The catalyst used in the reaction step (S12) is preferably used by being carried by a carrier such as silicon dioxide, graphite, rutile-type or anatase-type titanium dioxide, zirconium dioxide, and aluminum oxide for example. In particular, ruthenium oxide is preferably used by being carried by a carrier selected from these compounds.

A fixed-bed gas-phase flow method using a fixed bed type reactor can be applied for example as the reaction method of the reaction step (S12). A fixed bed type reactor can be used in which the temperature control of at least two reaction zones among the reaction zones is performed with a heat exchange method with a method described in Japanese Patent Application Laying-Open No. 2000-272907. In a reactor in which such reaction zones are divided into two or more, a problem can be practically avoided if two of the reaction zones of the first step are prepared and used alternatively by switching before the second step and up are poisoned. However, there is an aspect that preparing two expensive reactors is a disadvantage from the viewpoint of cost.

The fixed bed type reactor is a single fixed bed reaction tube of a plurality of fixed bed reaction tubes connected in series and has a jacket part outside of the reaction tube. The temperature in the reaction tube is controlled by a heating medium in the jacket part. The reaction heat produced in the reaction can be recovered by generating steam through the heating medium. The heating medium can be a molten salt, an organic heat medium, a molten metal, etc. However, a molten salt is preferable from the respect of heat stability, ease of handling, etc. The composition of the molten salt includes a mixture of potassium nitrate 50% by weight and sodium sulfite 50% by weight and a mixture of potassium nitrate 53% by weight, sodium sulfide 40% by weight, and sodium nitrate 7% by weight. The material used in the reaction tube includes metal, glass, and ceramic. The metal material includes Ni, SUS316L, SUS310, SUS304, Hastelloy B, Hastelloy C, and Inconel, and among these, Ni is preferable and Ni having a carbon content of 0.02% by weight or less is particularly preferable.

Further, the sulfur component concentration at the inlet of reactor 101 is preferably 1000 volppb or less, and more preferably 500 volppb or less. When the sulfur component concentration at the inlet port of reactor 101 exceeds 1000 volppb, the poisoning of sulfur can be avoided if only the poisoned catalyst is exchanged and not the whole catalyst. However, the operation of the plant has to be stopped while exchanging, and there is a fear that very complicated work becomes necessary. When the sulfur component concentration at the inlet port of reactor 101 is 1000 volppb or less, the operation is practically possible without a problem, and it is not necessary to remove the sulfur component completely using a large-scale apparatus and a complicated operation because the sulfur component concentration can be permitted that is very high compared to the conventional one. Therefore, the operation can be continued over a long period without refilling the catalyst. Moreover, the sulfur component concentration at the inlet port of this reactor can be measured with a gas chromatograph method for example.

Next, the absorption step (S13) of obtaining the mixed gas having chlorine and non-reacted oxygen as the main component is performed in an absorption column 102 by recovering a solution having hydrogen chloride and water as the main component by contacting with water and/or hydrochloric acid water, and/or, cooling gas having chlorine, water, non-reacted hydrogen chloride, and non-reacted oxygen that are obtained in the reaction step (S12) as the main component. The absorption step (S13) is performed at contact temperature of 0 to 100° C. and a pressure of 0.05 to 1 MPa. The concentration of the hydrochloric acid solution that is contacted is preferably 25% by weight or less. Further, a method described in Japanese Patent Application Laying-Open No. 2003-261306 is preferably adopted to prevent precipitation of chlorine hydrate.

The obtained solution can be used in adjusting pH of an electrolytic vessel, neutralization of boiler filled water, a condensation transfer reaction of aniline and formalin, a raw material of hydrochloric acid water electrolysis, for adding to food, etc. as it is or after removing chlorine contained in the solution by heating and/or by bubbling of an inert gas such as nitrogen. Further, it is possible to improve the yield of chlorine as a reaction raw material by obtaining hydrogen chloride gas by diffusing the whole and a part of hydrochloric acid as described in FIG. 3. 173 in Soda Handbook 1998, p 315, and further it is also possible to make the yield of chlorine almost 100% by removing water from the remaining hydrochloric acid after the diffusion with a method described in Japanese Patent Laying-Open No. 2001-139305.

Next, the drying step (S14) of obtaining dried mixed gas is performed by removing water content in the mixed gas obtained in the absorption step (S13). The water content in the gas after the drying step (S14) is preferably 0.5 mg/l or less, and more preferably 0.1 mg/l or less. A drying agent used when removing the water content in the mixed gas includes sulfuric acid, calcium chloride, magnesium perchlorate, and zeolite, and sulfuric acid is preferable because discharging after use is easy among these. The method of removing the water content in the mixed gas includes a method of contacting the mixed gas having chlorine and non-reacted oxygen obtained in the absorption step (S13) as the main component with sulfuric acid.

The concentration of sulfuric acid used in the drying step (S14) is preferably 90% by weight or more. When the sulfuric acid concentration is smaller than 90% by weight, the water content may not be able to be removed sufficiently.

The step is performed at a contact temperature of 0 to 80° C. and a pressure of 0.05 to 1 MPa.

In the case of using sulfuric acid as the drying agent, sulfuric acid mist is preferably removed right after the drying step (S14). For example, a blink eliminator and a method described in Japanese Patent Laying-Open No. 2003-181235 can be applied.

<Compressed Mixed Gas Producing Step>

Next, a compressed mixed gas producing step (S20) of producing a compressed mixed gas by introducing the mixed gas to an inlet 104a of a compressor 104 and compressing the mixed gas by compressor 104 is performed.

Compressor 104 is not especially limited as long as it is arranged between a drying column 103 and a purifying column 105 in the process of Embodiment 1. Further, an arbitrary compressor can be used as compressor 104.

<Refining Step>

Next, a purifying step (S30) is performed by introducing the compressed mixed gas to a purifying column 105 and separating the compressed mixed gas into purified chlorine and impurities by distillation. With the purifying step (S30), chlorine is obtained by separating the dried mixed gas obtained in the drying step (S14) into a liquid or a gas having chlorine as the main component (purified chlorine) and gas having non-reacted oxygen as the main component (impurities). The obtained purified chlorine is stored in a liquid salt drum 108 in Embodiment 1.

The method of separating the mixed gas into liquid or gas having chlorine as the main component and gas having non-reacted oxygen as the main component includes a method of compressing and/or cooling and/or a known method (for example, Japanese Patent Laying-Open No. 3-262514, National Patent Application No. 11-500954, etc.). For example, by compressing and/or cooling the mixed gas obtained in the drying step (S14), the mixed gas is separated into liquid containing chlorine (purified chlorine) and gas having non-reacted oxygen as the main component (impurity). The liquefaction of chlorine is performed at a pressure and a temperature at which chlorine that is regulated can exist in a liquid form. The lower the temperature is set in that range, the smaller the compression power can be made because the compression pressure becomes low. However, the compression pressure and the cooling temperature are industrially determined by considering the most suitable economic condition in this range due to the problem of equipment. In a normal operation, the liquefaction of chlorine is performed at a compression pressure of 0.5 to 5 MPa and a cooling temperature of −70 to 40° C. Moreover, in the compressed mixed gas producing step (S20), the mixed gas is preferably compressed in compressor 104 so that such pressure is achieved in a purifying column 105.

In the purifying step (S30), a step (S31) of discharging the impurities from a column top 105a in purifying column 105 is preferably performed. Since the impurities have non-reacted oxygen gas as the main component, the boiling point is lower than that of chlorine. Therefore, the distilled impurities become gas, and therefore the impurities are preferably discharged from column top 105a.

In the discharging step (S31), the impurities discharged from purifying column 105 are purged outside the process system in Embodiment. At this time, since the remaining chlorine is included in the impurities (purge gas), a detoxifying step is preferably performed to further remove chlorine in the purge gas to reduce the load to the environment. The methods of removing chlorine include a method of making the purge gas contact with an alkaline metal hydroxide solution, an alkaline metal thiosulfate solution, a solution of which alkaline metal sulfite and alkaline metal carbonate are dissolved, a solution of which alkaline metal hydroxide and alkaline metal sulfite are dissolved, etc. for example and a known method of separating and recovering chlorine in the purge gas (Japanese Patent Laying-Open No. 3-262514, Japanese Patent Laying-Open No. 10-25102, and National Patent Publication No. 11-500954). The amount of the purge gas is preferably 1 to 50% by volume in the purge gas having non-reacted oxygen separated with chlorine in the purifying step (S30), and more preferably 1 to 30% by volume.

Moreover, it is preferable that, in the purified chlorine obtained in the present invention, hydrogen is not substantially detected. Further, the concentration of bromine and iodine in the purified chlorine is preferably 10 ppm or less, and the concentration of nitrogen trichloride ($NCl_3$) in the purified chlorine is preferably 1 wtppm or less.

Further, the concentration of oxygen, nitrogen, carbon dioxide, and hydrogen can be measured by gas chromatography for example, the concentration of bromine and iodine is measured by oxidation reduction titration for example, and the concentration of nitrogen trichloride can be measured by absorption photometry respectively.

<Measuring Step>

Next, a measuring step of measuring the purity of the purified chlorine discharged from purifying column 105 is preferably performed. Then, a step (S40) of determining whether the purity of the purified chlorine measured in the measuring step is a prescribed purity or more or not is performed. When the purity of the purified chlorine is less than the prescribed purity in the determining step (S40), it is determined as NO in the determining step (S40). In this case, a recompressing step is performed by introducing the purified chlorine to inlet 104a of compressor 104 and compressing the mixed gas and the purified chlorine.

Moreover, the "purity" means a purity of chlorine in the purified chlorine, the "prescribed purity" is preferably 99.0% or more, and more preferably 99.5% or more. By setting the purity of chlorine at 99% or more, it can be used in various uses. By setting the purity of chlorine at 99.5% or more, it is preferably used as a raw material of vinylchloride and phosgen.

Further, an arbitrary method can be adopted as the method of measuring the purified chlorine discharged from purifying column 105 in the measuring step, and it can be measured with an online analyzer such as gas chromatography, for example.

<Recompressing Step>

When it is determined NO in the determining step (S40), a recompressing step of compressing the mixed gas and the purified chlorine is performed. Specifically, as shown in FIG. 2 for example, the purified chlorine discharged from purifying column 105 is stored in liquid salt tank 108. Then, a part of the product chlorine is evaporated by pumping out a prescribed amount of the purified chlorine from liquid salt tank 108 and rapidly decreasing the pressure, and then is completely vaporized in a carburetor 109. The vaporized purified chlorine is introduced to inlet 104a of compressor 104. Then, in the process in Embodiment 1, a valve 106 arranged in the middle of a pipe connecting between purifying column 105 and drying column 103 and between purifying column 105 and compressor 104 is opened. Additionally, in the process in Embodiment 1, a valve 107 arranged in the middle of purifying column 105 (carburetor 109 in Embodiment 1) and a pipe blowing the product chlorine is closed. Thus, the purified chlorine can be introduced to inlet 104a of compressor 104.

Then, the purified chlorine discharged from purifying column 105 is mixed with the mixed gas containing the dried chlorine discharged from drying column 103 in inlet 104a of compressor 104. Then, recompressed gas is produced by compressing the gas mixed in compressor 104. Then, the recompressed gas is introduced to purifying column 105.

After performing the recompressing step, the purifying step (S30) and the determining step (S40) are repeated. These steps (S30 and S40) are performed in the same manner as described above.

<Chlorine Producing Step>

On the other hand, when it is determined YES in the step (S40) of determining whether the purity of chlorine discharged from purifying column 105 is the prescribed purity or more or not by performing the measuring step, an inert gas and air that have been filling inside the process system in Embodiment 1 are removed. Therefore, the start-up in the process in Embodiment 1 is finished. When the start-up is finished, the purified chlorine is discharged as the product chlorine.

Specifically, in the process in Embodiment 1, valve 106 arranged in the middle of the pipe connecting between purifying column 105 and drying column 103 and between purifying column 105 and compressor 104 is closed. Additionally, valve 107 arranged in the middle of purifying column 105 (carburetor 109 in Embodiment 1) and a pipe blowing the product chlorine is opened. Thus, the purified chlorine that is discharged from purifying column 105 can be produced as the product chlorine.

Moreover, after it is determined YES in the determining step (S40), the purified chlorine can be produced as the product chlorine with the steps (S10 to S30). The liquid having the purified chlorine discharged from purifying column 105 as the main component as it is or a part of it or the whole is vaporized in carburetor 109, and then used as a raw material of vinyl chloride, phosgen, etc. In the case of using a part or the whole after vaporizing, a part of the heat that is necessary for the vaporization can be obtained by cooling the mixed gas obtained in the drying step (S14) using the latent evaporation heat of chlorine, and at the same time the amount of external refrigerant that is necessary for the cooling and liquefaction of chlorine in the mixed gas containing chlorine obtained in the drying step (S14) can be reduced. In the same manner, the latent evaporation heat of chlorine can be used in the pre-cooling of liquid fluorocarbon and the cooling of reflux liquid in the chlorine distillation column.

Further, a circulating step of supplying a part or the whole of the gas having non-reacted oxygen as the main component obtained in the purifying step (S40) to the reaction step (S12) is preferably performed. Further, when circulating the gas containing sulfuric acid mist into the reaction step (S12) in such way, the concentration of the sulfur component at the inlet port of reactor 101 is preferably 1000 volppb or less as described above.

As described above, the start-up method in Embodiment 1 of the present invention is a start-up method of a process for producing chlorine from hydrogen chloride and has the mixed gas producing step (S10) of producing the mixed gas containing chlorine from hydrogen chloride, the compressed mixed gas producing step (S20) of producing the compressed mixed gas by introducing the mixed gas to inlet 104a of compressor 104 and compressing the mixed gas with compressor 104, the purifying step (S30) of introducing the compressed mixed gas to purifying column 105 and separating it into the purified chlorine and impurities by distillation, and the re-compressing step of introducing the purified chlorine to inlet 104a of compressor 104 and compressing the mixed gas and the purified chlorine. Thus, during the start-up, the purified chlorine obtained in purifying column 105 is retained in liquid salt drum 108 without purging outside of the system, and the prescribed amount of the purified chlorine is evaporated in carburetor 109 and introduced to purifying column 105 again through compressor 104. That is, since the purified chlorine is retained or circulated inside of the process system in Embodiment 1, chlorine that is purged outside of the system can be reduced during the start-up. Therefore, the efficiency of producing chlorine from a raw material in the process of Embodiment 1 can be improved.

Further, since chlorine that is purged outside of the system can be reduced, the amount to be used of the alkaline solution that is needed to treat chlorine that is purged in the detoxifying step can be reduced. Therefore, the reduction of cost can be attempted during the start-up.

In the above-described start-up method, the purifying step (S30) preferably includes the step (S31) of discharging the impurities from column top 105a of purifying column 105. Thus, the impurities can be purged effectively to outside of the system from purifying column 105.

The above-described start-up method preferably further has the measuring step of measuring the purity of the purified chlorine discharged from purifying column 105. Thus, since the purity of the purified chlorine can be managed, the purity of the product chlorine is made to be in a desired range and high quality can be maintained.

In the above-described start-up method, the recompressing step is preferably performed when the purity of the purified chlorine in the measuring step is less than the prescribed purity. Thus, the purified chlorine remains or circulates inside of the system, and is not purged outside of the system until the purity of the purified chlorine is satisfactorily in the pre-scribed range. Therefore, chlorine discharged from inside of the system during the start-up can be reduced. Further, since the amount of chlorine discharged from inside of the system can be reduced, the amount to be used of the alkaline solution that is needed in the detoxifying step can be reduced. Furthermore, since the purity of the purified chlorine can be strictly managed, the purity of the product chlorine can be maintained.

In the above-described start-up method, the mixed gas producing step (S10) includes the steps (S12 and S13) of obtaining the mixed gas containing chlorine and oxygen by oxidizing hydrochloride. That is, the start-up method of a process producing chlorine from hydrogen chloride with a hydrochloric acid oxidation method is applied. Therefore, chlorine discharging to outside of the system during the start-up is reduced, and chlorine can be produced effectively from hydrogen chloride during the production.

(Embodiment 2)

Figure 3:
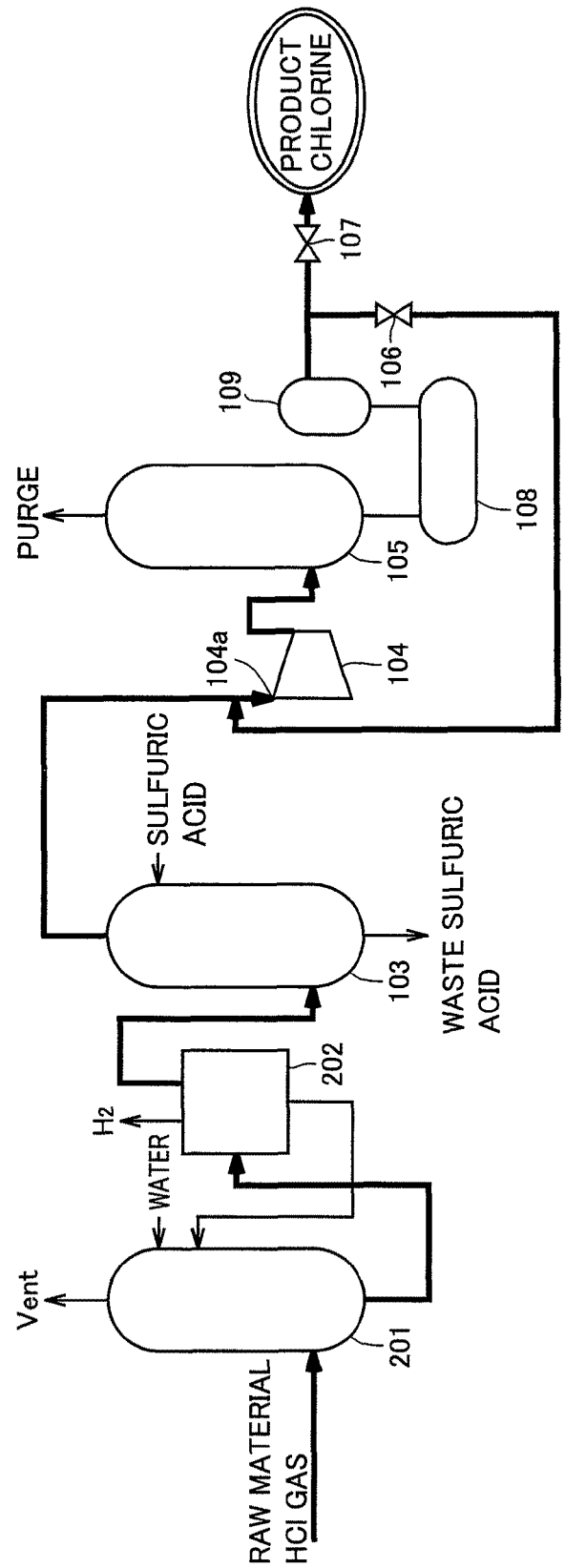
FIG. 3 is a view to describe the start-up method in Embodiment 2 of the present invention.

Referring to FIGS. 1 and 3, the start-up method in Embodiment 2 of the present invention is described. Embodiment 2 is a start-up method of hydrochloric acid water electrolysis as a process producing chlorine from hydrogen chloride. Moreover, FIG. 3 is a view to describe the start-up method in Embodiment 2 of the present invention.

The start-up method in Embodiment 2 is basically the same as the start-up method in Embodiment 1. However, only the mixed gas producing step (S10) differs. Soda handbook 1998, p 296-297, etc. can be applied to the mixed gas producing step (S10) in the hydrochloric acid water electrolysis method in Embodiment 2 for example. Below, the mixed gas producing step (S10) is described.

First, as shown in FIG. 3, hydrogen chloride gas is supplied to an absorbing column 201 as a raw material of chlorine.

Further, water is supplied to absorbing column 201. Thus, hydrochloric acid is produced in absorbing column 201.

Next, hydrochloric acid obtained in absorbing column 201 is supplied to a liquid phase electric vessel 202. Specifically, liquid phase electric vessel 202 includes a cathode chamber and an anode chamber, and each has a plurality of electrolytic elements. Then, hydrochloric acid is supplied to each of the cathode chamber and anode chamber. In liquid phase electric vessel 202, hydrochloric acid is electrolyzed while flowing each element, chlorine is mainly discharged in the anode chamber, and hydrogen is mainly discharged in the cathode chamber. Thus, the mixed gas containing chlorine discharged from the anode chamber in liquid phase electric vessel 202 can be obtained.

Next, the mixed gas containing chlorine discharged from liquid phase electric vessel 202 is supplied to drying column 103. In drying column 103, since the step is the same as the drying step (S14) in Embodiment 1, its description is not repeated. Thus, the mixed gas containing dried chlorine is obtained.

Next, the compressed mixed gas production step (S20) of producing the compressed mixed gas is performed by introducing the mixed gas to inlet 104a of compressor 104 and compressing the mixed gas by compressor 104. Next, the purifying step (S30) of introducing the compressed mixed gas to purifying column 105 and separating the compressed mixed gas into the purified chlorine and the impurities is performed. Then, the recompressing step of introducing the purified chlorine to inlet 104a of compressor 104 and compressing the mixed gas and the purified chlorine is performed. Since these steps are the same as those in Embodiment 1, their descriptions are not repeated.

As described above, according to the start-up method in Embodiment 2 of the present invention, it can be applied to the start-up method of a process producing chlorine from hydrogen chloride with hydrochloric acid water electrolysis. Therefore, even if it is by hydrochloric acid water electrolysis, chlorine that is purged outside of the system can be reduced, and the amount to be used of the alkaline solution that is needed for treating chlorine when purging can be reduced.

(Embodiment 3)

Figure 4:
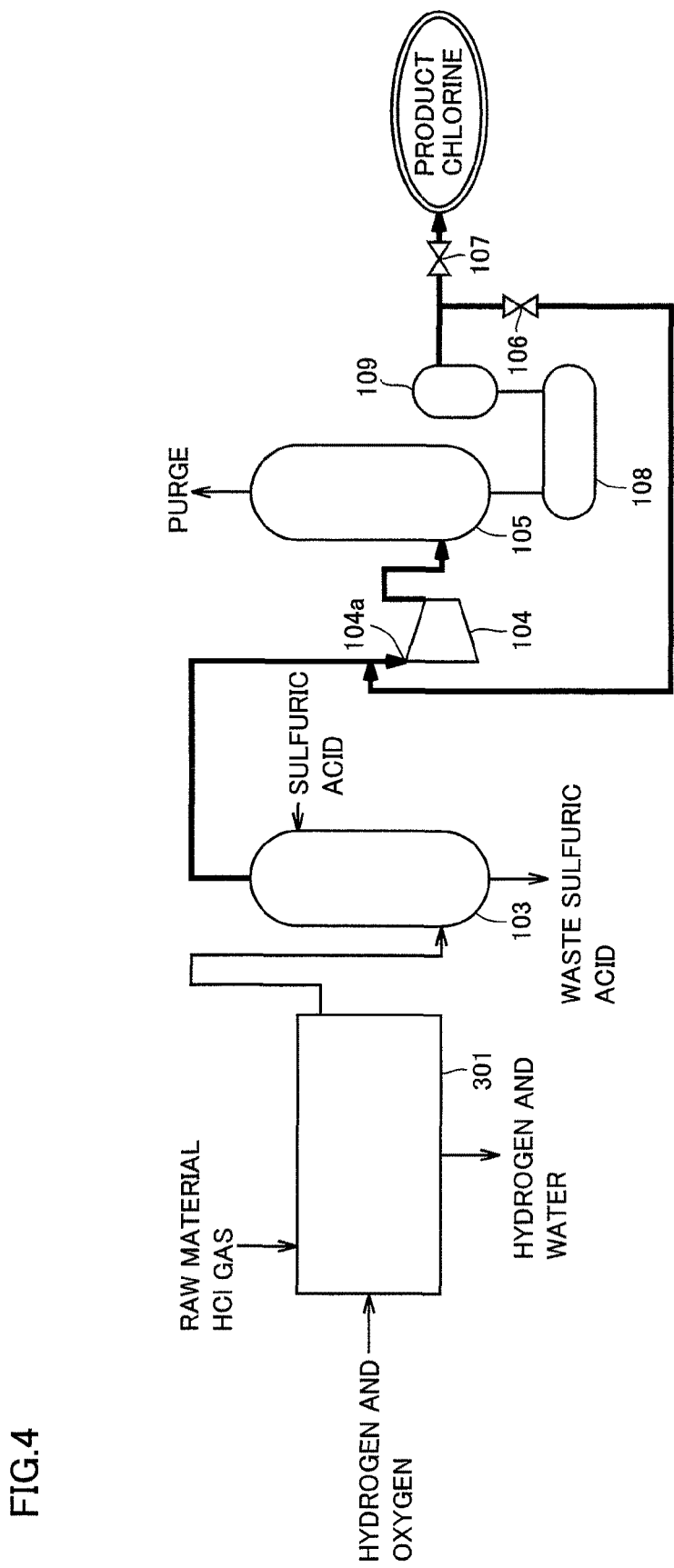
FIG. 4 is a view to describe the start-up method in Embodiment 3 of the present invention.

Referring to FIGS. 3 and 4, the start-up method in Embodiment 3 of the present invention is described. Embodiment 3 is a start-up method of anhydrous hydrochloric acid electrolysis as a process producing chlorine from hydrogen chloride. Moreover, FIG. 4 is a view to describe the start-up method in Embodiment 3 of the present invention.

The start-up method in Embodiment 3 is basically the same as the start-up method in Embodiment 1. However, only the mixed gas producing step (S10) differs. National Patent Application No. 2001-516333, etc. can be applied to the mixed gas producing step (S10) in the anhydrous hydrochloric acid electrolysis method in Embodiment 3 for example. Below, the mixed gas producing step (S10) is described.

Specifically, first, as shown in FIG. 4, hydrogen chloride gas is supplied to an electrochemical vessel 301 as a raw material of chlorine. Further, hydrogen and water are supplied to electrochemical vessel 301. The anhydrous hydrogen chloride is directly converted to dried chlorine gas in electrochemical vessel 301.

Specifically, an electric energy is applied to molecular anhydrous hydrogen chloride by the reaction below in electrochemical vessel 301, and dried chlorine gas and protons are produced by the following formula. Thus, the mixed gas containing chlorine is discharged from electrochemical vessel 301.

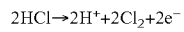

The mixed gas containing chlorine that is discharged from electrochemical vessel 301 is supplied to drying column 103. In drying column 103, since the step is the same as the drying step (S14) in Embodiment 1, its description is not repeated. Thus, the mixed gas containing dried chlorine is obtained.

Next, the compressed mixed gas production step (S20) of producing the compressed mixed gas by introducing the mixed gas to inlet 104a of compressor 104 and compressing the mixed gas by compressor 104 is performed. Next, the purifying step (S30) of introducing the compressed mixed gas to purifying column 105 and separating the compressed mixed gas into the purified chlorine and the impurities is preformed. Then, the recompressing step of introducing the purified chlorine to inlet 104a of compressor 104 and compressing the mixed gas and the purified chlorine is performed. Since these steps are the same as those in Embodiment 1, their descriptions are not repeated.

As described above, according to the start-up method in Embodiment 3 of the present invention, it can be applied to the start-up method of a process producing chlorine from hydrogen chloride with anhydrous hydrochloric acid electrolysis. Therefore, even if it is by anhydrous hydrochloric acid electrolysis, chlorine that is purged outside of the system can be reduced, and the amount to be used of the alkaline solution that is needed for treating chlorine when purging can be reduced.

(Embodiment 4)

Figure 5:
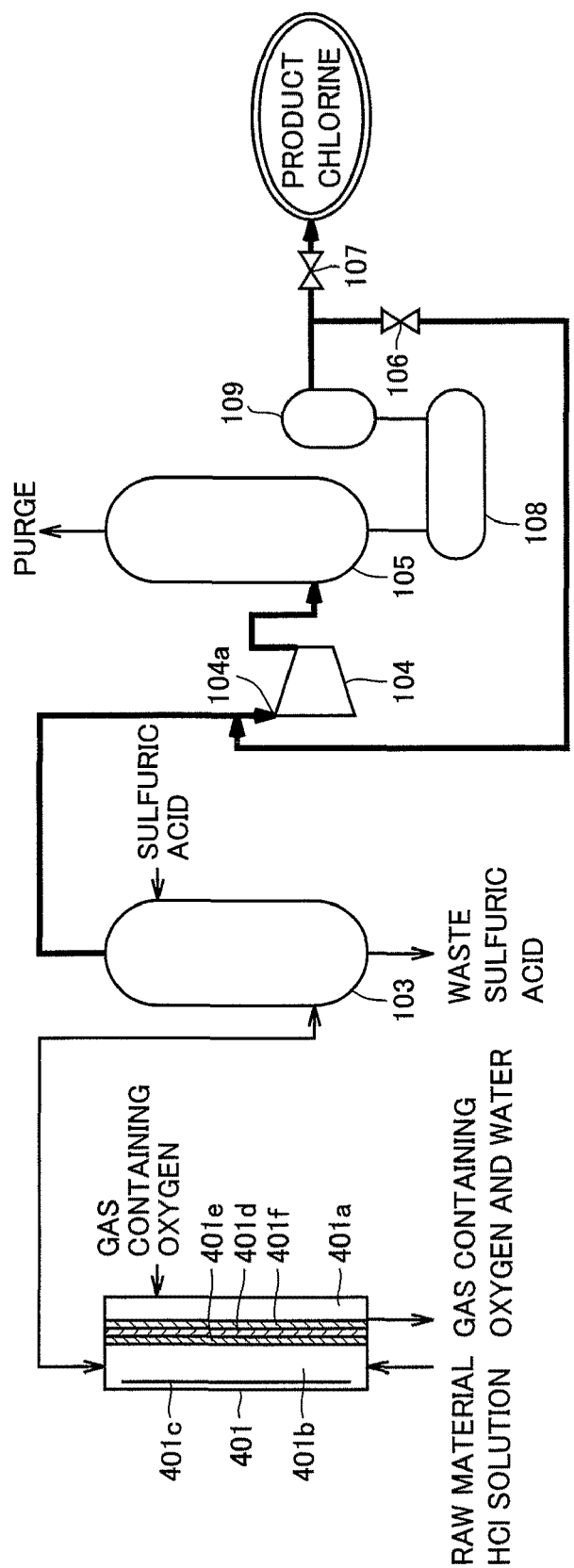
FIG. 5 is a view to describe the start-up method in Embodiment 4 of the present invention.

Referring to FIGS. 1 and 5, the start-up method in Embodiment 4 of the present invention is described. Embodiment 4 is a start-up method of oxygen consuming electrode hydrochloric acid electrolysis as a process producing chlorine from hydrogen chloride. Moreover, FIG. 5 is a view to describe the start-up method in Embodiment 4 of the present invention.

The start-up method in Embodiment 4 is basically the same as the start-up method in Embodiment 1. However, only the mixed gas producing step (S10) differs. Japanese Patent Laying-Open No. 2003-49290, etc. can be applied to the mixed gas producing step (S10) of producing the mixed gas by the oxygen consuming electrode hydrochloric acid electrolysis method in Embodiment 4 for example. The mixed gas producing step (S10) is described in the following.

Specifically, first, as shown in FIG. 5, hydrogen chloride solution is supplied to an electrolytic vessel 401 as a raw material of chlorine. Further, the gas containing oxygen is supplied to electrolytic vessel 401. The mixed gas containing chlorine is obtained in electrolytic vessel 401.

In detail, as shown in FIG. 5, electrolytic vessel 401 is divided into a cathode chamber 401a having an oxygen consuming type cathode 401d and an anode chamber 401b having an anode 401c with a cation exchange film 401e. Oxygen consuming type cathode 401d is disposed on the cathode chamber 401a side of oxygen consuming type cathode 401e. A current distributor 401f is disposed on the cathode chamber 401a side of oxygen consuming type cathode 401d. Since the pressure in anode chamber 401b is high, cation exchange film 401e is pressed onto oxygen consuming type cathode 401d, and oxygen consuming type cathode 401d is pressed onto current distributor 401f. In such way, oxygen consuming type cathode 401d forms sufficient electric contact and current is sufficiently supplied.

The hydrogen chloride solution as a raw material is supplied to anode chamber 401b. Chlorine is produced at anode 401c, and discharged from anode chamber 401b. The gas containing oxygen is supplied into cathode chamber 401a, and water is produced by reacting with proton diffusing into oxygen consuming type cathode 401d from anode chamber 401b at oxygen consuming type cathode 401d. The produced water is discharged with an excess gas containing oxygen.

Next, the mixed gas containing chlorine that is discharged from electrolytic vessel 401 is supplied to drying column 103. In drying column 103, since the step is the same as the drying step (S14) in Embodiment 1, its description is not repeated. Thus, the mixed gas containing dried chlorine is obtained.

Next, the compressed mixed gas producing step (S20) of producing the compressed mixed gas by introducing the mixed gas to inlet 104a of compressor 104 and compressing the mixed gas by compressor 104 is performed. Next, the purifying step (S30) of introducing the compressed mixed gas to purifying column 105 and separating the compressed mixed gas into the purified chlorine and the impurities is performed. Then, the recompressing step of introducing the purified chlorine to inlet 104a of compressor 104 and compressing the mixed gas and the purified chlorine is performed. Since these steps are the same as those in Embodiment 1, their descriptions are not repeated.

As described above, according to the start-up method in Embodiment 4 of the present invention, it can be applied to the start-up method of a process producing chlorine from hydrogen chloride by oxygen consuming electrode hydrochloric acid electrolysis. Therefore, even if it is by oxygen consuming electrode hydrochloric acid electrolysis, chlorine that is purged outside of the system can be reduced, and the amount to be used of the alkaline solution that is needed for treating chlorine when purging can be reduced.

Moreover, the start-up method of a process for producing chlorine from hydrogen chloride in Embodiments 1 to 4 is one example, and the start-up method in the present invention can be applied to all start-up methods of a process for producing chlorine from hydrogen chloride.

The embodiments disclosed in this application should be considered to be examples in all respects and not limited. The scope of the present invention is indicated by the scope of the appended clams, not by the above described embodiments, and all modifications having the equivalent meanings to the scope of the claims and within the scope are intended to be included therein.

Industrial Applicability

According to the start-up method in the present invention, the purified chlorine obtained in the purifying column is introduced to the purifying column again through the compressor. That is, since the purified chlorine is retained or circulated inside the system, the chlorine discharging from inside of the system during the start-up can be reduced. Further, since chlorine that is purged outside of the system can be reduced, the amount to be used of the alkaline solution that is needed for treating chlorine when purging outside of the system can be reduced.

The invention claimed is:

1. A start-up method of a process for producing chlorine from hydrogen chloride comprising:
   a) producing a mixed gas containing said chlorine from said hydrogen chloride in a process system, wherein at start-up, the process system contains inert gas and air;
   b) producing a compressed mixed gas by introducing said mixed gas to an inlet of a compressor and compressing said mixed gas by said compressor;
   c) purifying said compressed mixed gas in a purifying column to separate said compressed mixed gas into chlorine and impurities by distillation, wherein the impurities include the inert gas and air present in the process system at start-up;
   d) recompressing said purified chlorine by introducing said purified chlorine to the inlet of said compressor and compressing said mixed gas and said purified chlorine to obtain a recompressed gas;
   e) passing the recompressed gas to step c) to obtain a purer chlorine;
   f) a measuring step of measuring a purity of said purer chlorine that is discharged from said purifying column, and
   g) if the purity of said purer chlorine is less than a prescribed purity, passing the purer chorine to step d) and if the purity of said purer chlorine is at or higher than the prescribed purity, the purer chlorine is recovered as the chlorine product.

2. The start-up method according to claim 1, wherein said mixed gas producing step includes the step of obtaining a mixed gas containing said chlorine and oxygen by oxidizing said hydrogen chloride.

* * * * *